United States Patent
Li et al.

(10) Patent No.: US 11,480,472 B2
(45) Date of Patent: Oct. 25, 2022

(54) WIRELESS TEMPERATURE MEASUREMENT SYSTEM AND SIGNAL PROCESSING METHOD THEREOF

(71) Applicant: SHENZHEN HUAYUAN MICRO ELECTRONIC TECHNOLOGY CO., LTD., Shenzhen (CN)

(72) Inventors: Shanbin Li, Shenzhen (CN); Ning Wang, Shenzhen (CN); Xinglong Huang, Shenzhen (CN); Shaokan Liu, Shenzhen (CN); Zhongyun Zhang, Shenzhen (CN)

(73) Assignee: ZHEJIANG HUAYUAN MICRO ELECTRONIC TECHNOLOGY CO., LTD., Huzhou (CN)

( * ) Notice: Subject to any disclaimer, the term of this patent is extended or adjusted under 35 U.S.C. 154(b) by 614 days.

(21) Appl. No.: 16/537,714

(22) Filed: Aug. 12, 2019

(65) Prior Publication Data
US 2019/0360868 A1    Nov. 28, 2019

Related U.S. Application Data

(63) Continuation of application No. PCT/CN2017/088442, filed on Jun. 15, 2017.

(51) Int. Cl.
*G01K 1/024* (2021.01)
*G01K 15/00* (2006.01)
*G01K 13/00* (2021.01)

(52) U.S. Cl.
CPC .............. *G01K 1/024* (2013.01); *G01K 13/00* (2013.01); *G01K 15/007* (2013.01)

(58) Field of Classification Search
CPC ....... G01K 1/024; G01K 13/00; G01K 15/007
See application file for complete search history.

(56) References Cited

U.S. PATENT DOCUMENTS

2012/0281606 A1* 11/2012 Cooney ............... E06B 9/32
                                                    370/311
2015/0338283 A1    12/2015 Chien et al.

FOREIGN PATENT DOCUMENTS

CN         1344068 A      4/2002
CN     100565606 C  * 12/2009 ............. B60R 25/24
(Continued)

OTHER PUBLICATIONS

English machine translation of Reene (CN 100565606 C) (Year: 2009).*

(Continued)

*Primary Examiner* — Roy Y Yi
*Assistant Examiner* — Geoffrey T Evans
(74) *Attorney, Agent, or Firm* — True Shepherd LLC; Andrew C. Cheng

(57) ABSTRACT

A signal processing method of a wireless temperature measurement system comprises: acquiring inherent background noise intensity of a receiver (11) of a reader (10) and maximum output signal intensity of the receiver (S101); acquiring current noise intensity on a receiving channel of the receiver (11) in real time when an antenna (14) is connected to the reader (10) and an excitation signal is not transmitted to a temperature sensor (20) (S102); and determining an intensity threshold value of a temperature signal currently measured by the temperature sensor (20) according to the background noise intensity, the maximum output signal intensity and the current noise intensity (S103).

8 Claims, 3 Drawing Sheets

(56) References Cited

FOREIGN PATENT DOCUMENTS

| | | |
|---|---|---|
| CN | 102944902 A | 2/2013 |
| CN | 105092081 A | 11/2015 |
| CN | 204556133 U | 8/2018 |

OTHER PUBLICATIONS

Internation Search Report of PCT/CN2017/088442, dated Jan. 11, 2017.

* cited by examiner

WIRELESS TEMPERATURE MEASUREMENT SYSTEM AND SIGNAL PROCESSING METHOD THEREOF

CROSS-REFERENCE TO RELATED APPLICATIONS

This application is a continuation of International Patent Application No. PCT/CN2017/088442 with a filing date of Jun. 15, 2017, designating the United States, and further claims priority to Chinese Patent Application No. 201710109653.7 with a filing date of Feb. 27, 2017. The content of the aforementioned applications, including any intervening amendments thereto, are incorporated herein by reference.

TECHNICAL FIELD

The disclosure relates to the field of wireless temperature measurement, and particularly relates to a wireless temperature measurement system and a signal processing method thereof.

BACKGROUND OF THE PRESENT INVENTION

Wireless temperature measurement is a new trend in temperature measurement. A wireless temperature measurement system comprises a reader and a wireless temperature sensor. The transmitter of the reader emits an excitation signal to excite the wireless temperature sensor to collect a temperature signal, and the wireless temperature sensor transmits the temperature signal to the receiver of the reader through a wireless communication module, so as to acquire the temperature of an environment of the wireless temperature sensor.

The signal collected by the wireless temperature sensor is easy to be interfered by various objective factors, resulting in errors in the temperature finally acquired by the reader. The general static weight threshold algorithm is not capable of overcoming the defects that the average error and the maximum error of the signal cannot be eliminated at the same time, causing an inaccurate measurement result.

SUMMARY OF PRESENT INVENTION

In view of above, it is necessary to provide a wireless temperature measurement system and a signal processing method thereof, so that the measured temperature is less affected by the environment and measurement results are accurate.

A signal processing method of a wireless temperature measurement system comprises: acquiring inherent background noise intensity of a receiver of a reader and maximum output signal intensity of the receiver; acquiring current noise intensity on a receiving channel of the receiver in real time when an antenna is connected to the reader and an excitation signal is not transmitted to a temperature sensor: and determining an intensity threshold value of a temperature signal currently measured by the temperature sensor according to the background noise intensity, the maximum output signal intensity and the current noise intensity.

A wireless temperature measurement system comprises: a temperature sensor; a reader wirelessly connected with the temperature season a receiver arranged in the reader and configured for receiving a temperature signal measured by the temperature sensor; a wave demodulator arranged in the receiver, configured for acquiring inherent background noise intensity of the receiver of the reader and maximum output signal intensity of the receiver and also configured for acquiring current noise intensity on a receiving channel of the receiver in real lime when an antenna is connected to the reader and an excitation signal is not transmitted to the temperature sensor; and a processor arranged in the reader, connected with the wave demodulator and configured for determining an intensity threshold value of a temperature signal currently measured by the temperature sensor according to the background noise intensity, the maximum output signal intensity and the current noise intensity.

Details of one or more embodiments of the disclosure are proposed in the drawings and illustration below. Other features, purposes and advantages of the disclosure will become apparent from the description, the drawings and claims.

DETAILED DESCRIPTION OF PREFERRED EMBODIMENTS

Figure 1:
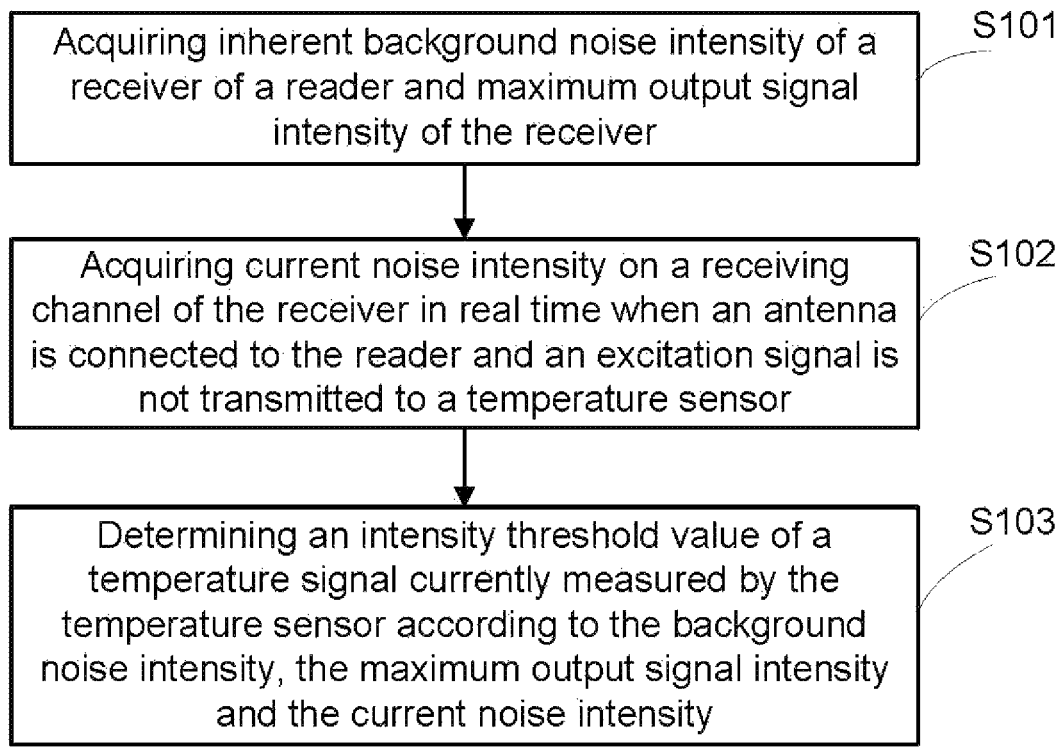
FIG. 1 is a flow chart showing a signal processing method of a wireless temperature measurement system according to an embodiment.

Referring to FIG. 1, FIG. 1 is a flow chart showing a signal processing method of a wireless temperature measurement system according to an embodiment.

In step S101, inherent background noise intensify of a receiver of a reader and maximum output signal intensity of the receiver are acquired.

When an antenna is not connected to the reader, the static noise signal intensity, i.e., the inherent background noise intensity, of a receiver circuit is measured, and can be acquired in a single-board radio frequency path test during a production process. The temperature sensor, specifically, a wireless temperature sensor transmits a temperature signal to the receiver of the reader through a wireless communication module after collecting the temperature signal, and the receiver transmits the temperature signal to a processor of the reader for receiving and processing the temperature signal. The inherent background noise intensity of the receiver reflects the inherent noise of a receiving path of the receiver. The inherent noise directly affects the intensity of the temperature signal finally acquired by the reader.

After receiving the temperature signal transmitted by the wireless temperature sensor, the receiver transmits the temperature signal to the processor of the reader. The temperature signal transmitted by the receiver does not exceed the maximum output signal intensity of the receiver, i.e., the maximum temperature signal intensity.

In step S102, current noise intensity on a receiving channel of the receiver is acquired in real time when an antenna is connected to the reader and when an excitation signal is not transmitted to the temperature sensor.

The reader also comprises an antenna. The transmitter or the receiver of the reader transmits or receives signals through the antenna respectively. When the antenna is connected, the current environmental noise can be received by the receiver through the antenna. At this time, the noise signal intensity on the receiving path of the receiver is detected to reflect environmental interference corresponding to the whole of the current environmental noise and the inherent noise of the receiver.

A plurality of noise signals received by the receiver at this time are acquired in real time, and stored in a stack in a first-in first-out manner. The current noise intensity of the receiver is obtained by using a sliding window averaging algorithm or a Gaussian weighted filtering algorithm or other filtering algorithms according to a plurality of closest noise signals.

In step S103, an intensity threshold value of a temperature signal currently measured by the temperature sensor is determined according to the background noise intensity, the maximum output signal intensity and the current noise intensity.

When the wireless temperature measurement system is operated, a current noise signal after the reader is connected with the antenna directly affects the intensity of the temperature signal sampled by the wireless sensor and finally acquired by the reader. The current noise signal needs to be eliminated to ensure the detection accuracy of temperature signal and improve the detection accuracy.

The current noise signal comprises the inherent background noise of the receiver. Therefore, in general, the current noise intensity corresponding to the current noise signal after the reader is connected with the antenna is greater than the inherent background noise intensity of the receiver.

The currently measured intensity threshold value of the temperature signal is set. The intensity threshold value can largely reflect the noise interference in the current working environment of the wireless temperature measurement system. After the reader acquires the temperature signal collected by the wireless temperature sensor, the intensity of the temperature signal is determined based on the intensity threshold value.

In one embodiment, the currently measured intensity threshold value of the temperature signal is determined in the following manner:

The current noise intensity is used as the intensity threshold value of the current noise intensity is between the background noise intensity and the maximum output signal intensity.

The background noise intensity is used as the intensity threshold value if the current noise intensity is less than or equal to the background noise intensity.

A value obtained by subtracting a preset intensity adjusting value from the maximum output signal intensity is used as the intensity threshold value if the current noise intensity is greater than or equal to the maximum output signal intensity.

In one embodiment, the preset intensity adjusting value is 0.3 db.

The above signal processing method of the wireless temperature measurement system comprises: acquiring the inherent background noise intensity of the receiver of the reader and the maximum output signal intensity of the receiver; acquiring a plurality of noise signals received by the receiver in real time when an antenna is connected to the reader and an excitation signal is not transmitted to the temperature sensor; obtaining the current noise intensity according to the plurality of noise signals; determining an intensity threshold value of a temperature signal currently measured by the temperature sensor according to the background noise intensity, the maximum output signal intensity and the current noise intensity; determining the currently measured intensity threshold value of the temperature signal in combination with the inherent characteristics of the receiver of the reader and the current noise intensity on the receiving path of the receiver, the intensity threshold value updating and reflecting the current noise interference of the wireless temperature measurement system in real time; and determining the intensity of the currently measured temperature signal based on the intensity threshold value, so that the temperature measured by the wireless temperature measurement system is less affected by the environmental interference, and the measurement result is accurate.

Figure 2:
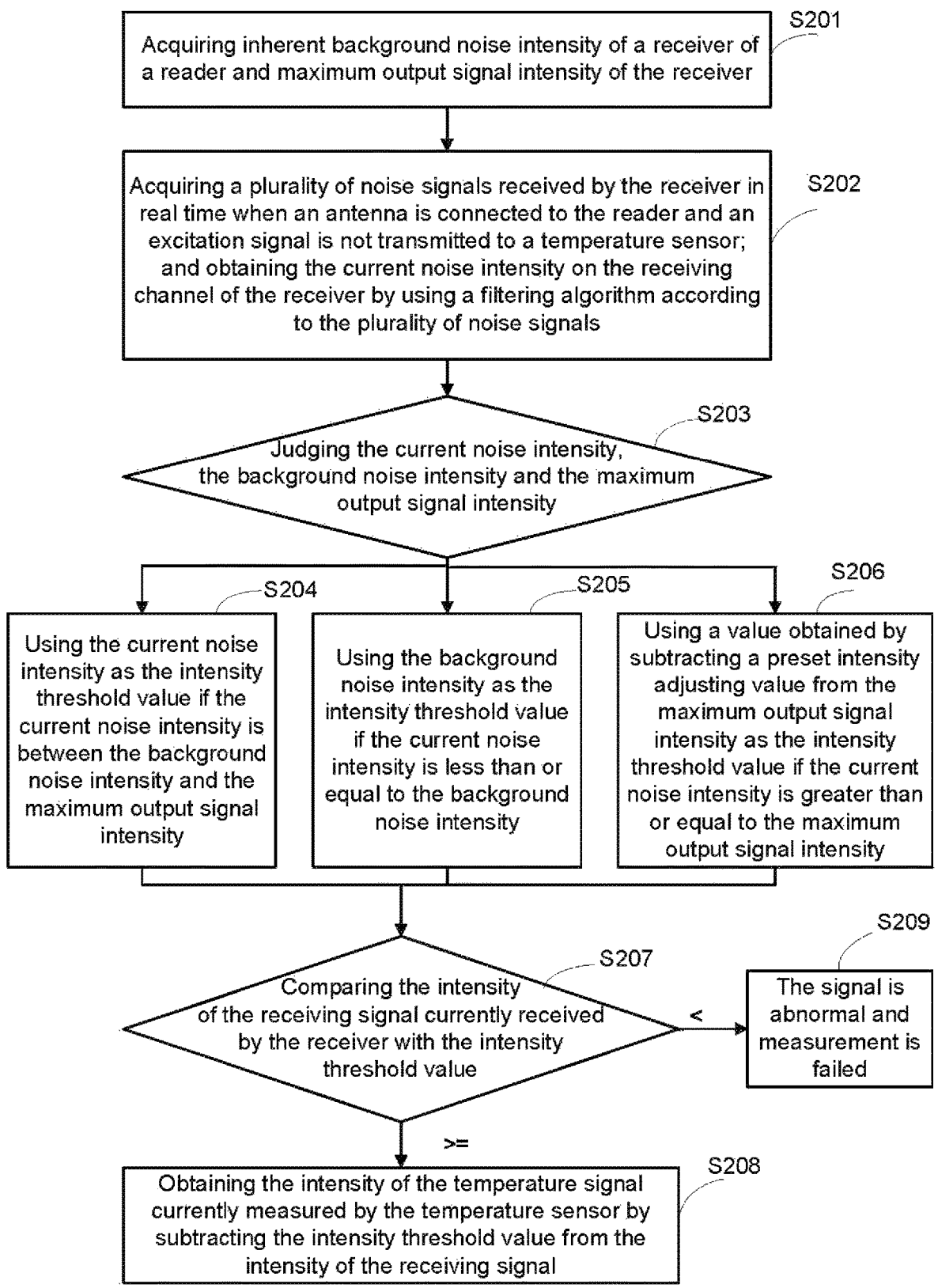
FIG. 2 is a flow chart showing a signal processing method of a wireless temperature measurement system according to another embodiment.

Referring to FIG. 2, FIG. 2 is a flow chart showing a signal processing method of a wireless temperature measurement system in another embodiment.

In the present embodiment, the signal processing method of the wireless temperature measurement system comprises:

Step S201: acquiring an inherent background noise intensity of a receiver of a reader and maximum output signal intensity of the receiver.

Step S202: acquiring a plurality of noise signals received by the receiver in real time when an antenna is connected to the reader and when an excitation signal is not transmitted to a temperature sensor: and obtaining the current noise intensity on the receiving channel of the receiver by using a filtering algorithm according to the plurality of noise signals.

Step S203: judging the current noise intensity, the background noise intensity and the maximum output signal intensity, and entering into steps S204 to S206 according to judgment results.

Step S204: using the current noise intensity as the intensity threshold value if the current noise intensity is between the background noise intensity and the maximum output signal intensity.

Step S205: using the background noise intensity as the intensity threshold value if the current noise intensity is less than or equal to the background noise intensity.

Step S206: using a value obtained by subtracting a preset intensity adjusting value from the maximum output signal intensity as the intensity threshold value if the current noise intensity is greater than or equal to the maximum output signal intensity.

The rationality of the current noise intensity is judged according to the inherent background noise intensity of the receiver and the maximum output signal intensity of the receiver. Since the current noise intensity on the receiving path of the receiver after the reader is connected to the antenna is greater than the inherent background noise intensity, in general, the current noise intensity is greater than the background noise intensity, but less than the maximum output signal intensity of the receiver. When the current noise intensity is between the background noise intensity and the maximum output signal intensity, the current noise intensity is used as an intensity threshold value reflecting the current interference of the wireless temperature measurement system.

Step S207: comparing the receiving signal intensity currently received by the receiver with the intensity threshold value; and if the receiving signal intensity is greater than or equal to the intensity threshold value, entering step S208; and if the receiving signal intensity is less than the intensity threshold value, entering step S209.

Step S208: obtaining the intensity of the temperature signal currently measured by the temperature sensor by subtracting the intensity threshold value from the receiving signal intensity.

After the receiving signal intensity currently received by the receiver is obtained, the receiving signal intensity is compared with the intensity threshold value reflecting the current noise interference; and if the receiving signal intensity is greater than or equal to the intensity threshold value, a result obtained by subtracting the intensity threshold value from the receiving signal intensity is used as the intensity of the temperature signal currently measured by the temperature sensor.

Step S209: determining that the signal is abnormal and measurement is failed.

If the receiving signal intensity is less than the intensity threshold value, i.e., the noise intensity corresponding to the current noise Interference reflected by the intensity threshold value is not reached, then the temperature signal obtained by this measurement is abnormal, and the measurement is failed.

The above signal processing method of the wireless temperature measurement system comprises: determining the currently measured intensity threshold value of the temperature signal in combination with the inherent characteristics of the receiver of the reader and the current noise intensity on the receiving path of the receiver, the intensity threshold value updating and reflecting the current noise interference of the wireless temperature measurement system in real time; and determining the intensity of the currently measured temperature signal based on the intensity threshold value, and obtaining the intensity of the temperature signal actually acquired by the reader by subtracting the intensity threshold value from the receiving signal intensity currently received by the receiver, so that the temperature measured by the wireless temperature measurement system is less affected by the environmental interference, and the measurement result is accurate.

Figure 3:
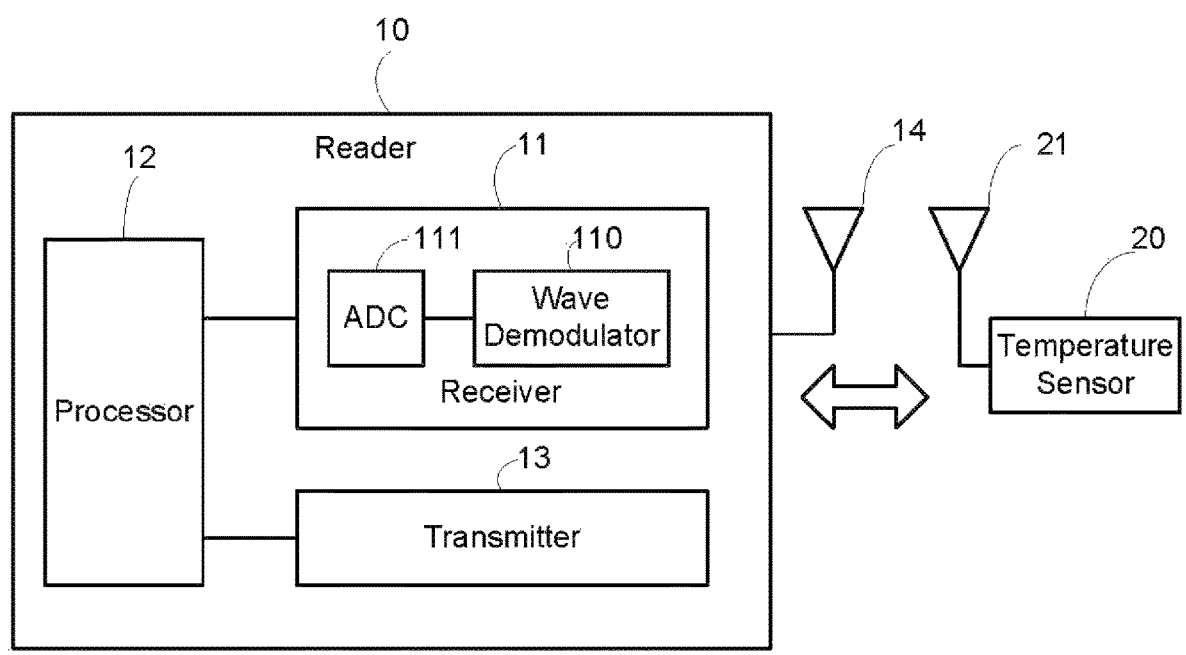
FIG. 3 is a structural block diagram showing a wireless temperature measurement system according to an embodiment.

Referring to FIG. 3, FIG. 3 is a structural block diagram showing a wireless temperature measurement system in an embodiment.

In the present embodiment, the wireless temperature measurement system comprises a reader 10 and a temperature sensor 20 which are wirelessly connected, a receiver 11 arranged in the reader 10, a processor 12 and a wave demodulator 110 arranged in the receiver 11. The receiver 11 is configured for receiving a temperature signal measured by the temperature sensor 20.

The wave demodulator 110 is arranged in the receiver 11, configured for acquiring inherent background noise intensity of the receiver 11 of the reader 10 and maximum output signal intensity and also configured for acquiring current noise intensity on a receiving channel of the receiver 11 in real time when an antenna 14 is connected to the reader 10 and an excitation signal is not transmitted to the temperature sensor 20.

The processor 12 is connected with the wave demodulator 110 and configured for determining the intensity threshold value of the temperature signal currently measured by the temperature sensor 20 according to the background noise intensity, the maximum output signal intensity and the current noise intensity.

In one embodiment, the determining an intensity threshold value of a temperature signal currently measured by the temperature sensor 20 according to the background noise intensity, the maximum output signal intensity and the current noise intensity comprises:

Using the current noise intensity as the intensity threshold value if the current noise intensity is between the background noise intensity and the maximum output signal intensity;

Using the background noise intensity as the intensity threshold value if the current noise intensity is less than or equal to the background noise intensity; and Using a value obtained by subtracting a preset intensity adjusting value from the maximum output signal intensity as the intensity threshold value if the current noise intensity is greater than or equal to the maximum output signal intensity.

In one embodiment, the processor 12 is also configured for determining the intensity of a temperature signal currently measured by the temperature sensor 20 according to the intensity threshold value and the intensity of a receiving signal currently received by the receiver 11.

In one embodiment, the determining the intensity of a temperature signal currently measured by the temperature sensor 20 according to the intensity threshold value and the intensity of a receiving signal currently received by the receiver 11 comprises:

determining that the signal is abnormal and measurement is failed if the receiving signal intensity currently received by the receiver 11 is less than the intensity threshold value; and obtaining the intensity of the temperature signal currently measured by the temperature sensor 20 by subtracting the intensity threshold value from the receiving signal intensity if the receiving signal intensity currently received by the receiver is greater than or equal to the intensity threshold value.

In one embodiment, the reader 10 further comprises an antenna 14. The temperature sensor 20 further comprises an antenna 21. The temperature sensor wirelessly communicates with the reader 10 through the antenna 21 and the antenna 14.

In one embodiment, the reader 10 further comprises a transmitter 13 configured for transmitting a control signal of the reader 10 to the temperature sensor 20 through the antenna 14.

In one embodiment, the receiver 11 further comprises an AD converter 11 configured for converting signals detected by the wave demodulator 110, including the inherent background noise intensity of a receiver 11, the maximum output signal intensity of the receiver and the current noise intensity, into digital signals and transmitting the digital signals to the processor 12 for signal processing.

The signal processing system of the above wireless temperature measurement system judges the rationality of the current noise intensity on the receiving path of the receiver 11 in combination with the inherent characteristics of the receiver 11 of the reader 10, including the inherent background noise intensity and the maximum output signal intensity of the receiver. When the current noise intensity is between the inherent background noise intensity of the receiver 11 and the maximum output signal intensity, the current noise intensity is used as the intensity threshold value of the currently measured temperature signal. The intensity threshold value updates in real time and reflects in time the current noise interference of the wireless temperature measurement system, and the currently measured temperature signal intensity is determined based on the intensity threshold value. The intensity of the temperature signal actually acquired by the reader 10 is obtained by subtracting the intensity threshold value from the signal intensity currently received by the receiver 11, i.e., the current noise interference is eliminated, so that the temperature measured by the wireless temperature measurement system is less affected by the environmental interference, and the measurement result is accurate.

Various technical features of the above embodiments can be combined in any manner. For concise illustration, not all possible combinations of the various technical features in the above embodiments are described. However, as long as there is no contradiction in the combinations of these technical features, the combinations shall be considered as the scope of the present Description.

The above embodiments only express several implementation modes of the present invention, and are described more specifically in detail, but shall not be consequently interpreted as a limitation to the scope of the present invention. It should be noted that, for those of ordinary skill in the art, several variations and improvements can also be made without departing from the concept of the present invention, all of which belong to the protection scope of the present invention. Therefore, the protection scope of the present invention shall be subject to appended claims.

We claim:

1. A signal processing method of a wireless temperature measurement system, comprising:
  acquiring inherent background noise intensity of a receiver of a reader and maximum output signal intensity of the receiver;
  acquiring current noise intensity on a receiving channel of the receiver in real time when an antenna is connected to the reader and an excitation signal is not transmitted to a temperature sensor; and
  determining an intensity threshold value of a temperature signal currently measured by the temperature sensor according to the background noise intensity, the maximum output signal intensity and the current noise intensity;
  wherein the determining the intensity threshold value of the temperature signal currently measured by the temperature sensor according to the background noise intensity, the maximum output signal intensity and the current noise intensity comprises:
  using the current noise intensity as the intensity threshold value if the current noise intensity is between the background noise intensity and the maximum output signal intensity;
  using the background noise intensity as the intensity threshold value if the current noise intensity is less than or equal to the background noise intensity; and
  using a value obtained by subtracting a preset intensity adjusting value from the maximum output signal intensity as the intensity threshold value if the current noise intensity is greater than or equal to the maximum output signal intensity.

2. The method according to claim 1, wherein after determining the intensity threshold value of the temperature signal currently measured by the temperature sensor according to the background noise intensity, the maximum output signal intensity and the current noise intensity, the method further comprises:
  determining an intensity of the temperature signal currently measured by the temperature sensor according to the intensity threshold value and an intensity of a receiving signal currently received by the receiver.

3. The method according to claim 2, wherein the determining the intensity of the temperature signal currently measured by the temperature sensor according to the intensity threshold value and the intensity of the receiving signal currently received by the receiver comprises:
  determining that the signal is abnormal and measurement is failed if the intensity of the receiving signal currently received by the receiver is less than the intensity threshold value; and
  obtaining the intensity of the temperature signal currently measured by the temperature sensor by subtracting the intensity threshold value from the intensity of the receiving signal if the intensity of the receiving signal currently received by the receiver is greater than or equal to the intensity threshold value.

4. The method according to claim 1, wherein the acquiring current noise intensity on the receiving channel of the receiver in real time when the antenna is connected to the reader and the excitation signal is not transmitted to the temperature sensor comprises:
  acquiring a plurality of noise signals received by the receiver in real time when the antenna is connected to the reader and the excitation signal is not transmitted to the temperature sensor; and obtaining the current noise intensity on the receiving channel of the receiver by using a filtering algorithm according to the plurality of noise signals.

5. The method according to claim 1, wherein the preset intensity adjusting value is 0.3 db.

6. A wireless temperature measurement system, comprising:
  a temperature sensor;
  a reader wirelessly connected with the temperature sensor;
  a receiver arranged in the reader and configured for receiving a temperature signal measured by the temperature sensor;
  a wave demodulator arranged in the receiver, configured for acquiring inherent background noise intensity of the receiver in the reader and maximum output signal intensity of the receiver and further configured for acquiring a current noise intensity on a receiving channel of the receiver in real time when an antenna is connected to the reader and an excitation signal is not transmitted to the temperature sensor; and
  a processor arranged in the reader, connected with the wave demodulator and configured for determining an intensity threshold value of a temperature signal currently measured by the temperature sensor according to the background noise intensity, the maximum output signal intensity and the current noise intensity;
  wherein the determining the intensity threshold value of the temperature signal currently measured by the temperature sensor according to the background noise intensity, the maximum output signal intensity and the current noise intensity comprises:
  using the current noise intensity as the intensity threshold value if the current noise intensity is between the background noise intensity and the maximum output signal intensity;
  using the background noise intensity as the intensity threshold value if the current noise intensity is less than or equal to the background noise intensity; and
  using a value obtained by subtracting a preset intensity adjusting value from the maximum output signal intensity as the intensity threshold value if the current noise intensity is greater than or equal to the maximum output signal intensity.

7. The wireless temperature measurement system according to claim 6, wherein the processor is further configured for determining an intensity of the temperature signal currently measured by the temperature sensor according to the intensity threshold value and an intensity of a receiving signal currently received by the receiver.

8. The wireless temperature measurement system according to claim 7, wherein the determining the intensity of the temperature signal currently measured by the temperature sensor according to the intensity threshold value and the intensity of the receiving signal currently received by the receiver comprises:

determining that the signal is abnormal and measurement is failed if the intensity of the receiving signal currently received by the receiver is less than the intensity threshold value; and obtaining the intensity of the temperature signal currently measured by the temperature sensor by subtracting the intensity threshold value from the intensity of the receiving signal if the intensity of the receiving signal currently received by the receiver is greater than or equal to the intensity threshold value.

* * * * *